(12) United States Patent
Chung et al.

(10) Patent No.: US 8,638,967 B2
(45) Date of Patent: Jan. 28, 2014

(54) FOLDABLE ELECTRONIC DEVICE

(75) Inventors: Chung-Jen Chung, Taipei (TW);
Hsing-Cheng Liu, Taipei (TW);
Shun-Lung Wang, Taipei (TW);
Ming-Chih Huang, Taipei (TW);
Chih-Min Huang, Taipei (TW);
Po-Yang Shih, Taipei (TW); Yen-Ting Liu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 518 days.

(21) Appl. No.: 12/715,365

(22) Filed: Mar. 1, 2010

(65) Prior Publication Data

US 2010/0246874 A1  Sep. 30, 2010

(30) Foreign Application Priority Data

Mar. 27, 2009 (TW) .............................. 98110214 A (51) Int. Cl.
*H04R 9/06* (2006.01)
(52) U.S. Cl.
USPC .......................................... 381/334; 361/683
(58) Field of Classification Search
USPC ............... 381/333–336, 24, 385–388, 87, 88,
381/382; 361/683, 682, 686, 679.55;
455/575.3; 379/433.01, 433.02,
379/420.01, 420.02
See application file for complete search history.

(56) References Cited

U.S. PATENT DOCUMENTS

| 5,507,013 | A | * | 4/1996 | Weadon et al. ............ 455/575.3 |
| 6,078,497 | A | * | 6/2000 | Derocher et al. ........ 361/679.55 |
| 6,600,827 | B2 | * | 7/2003 | Lu ................................ 381/388 |

FOREIGN PATENT DOCUMENTS

| CN | 2385363 | | 6/2000 | |
| CN | 2461072 | | 11/2001 | |
| TW | M282466 | * | 12/2005 | ............... H04N 7/00 |
| TW | M283466 | | 12/2005 | |

OTHER PUBLICATIONS

"Office Action of Taiwan Counterpart Application", issued on Aug. 11, 2011, p. 1-p. 4, in which the listed reference was cited.

* cited by examiner

*Primary Examiner* — Lun-See Lao
(74) *Attorney, Agent, or Firm* — Jianq Chyun IP Office (57) ABSTRACT

A foldable electronic device includes a first body, a second body, a pivot element and a loudspeaker. The pivot element is pivotally connected between the first body and the second body, and the loudspeaker is disposed in the pivot element and is capable of protruding out of a side of the pivot element.

8 Claims, 9 Drawing Sheets

FOLDABLE ELECTRONIC DEVICE

CROSS-REFERENCE TO RELATED APPLICATION

This application claims the priority benefit of Taiwan application serial no. 98110214, filed on Mar. 27, 2009. The entirety of the above-mentioned patent application is hereby incorporated by reference herein and made a part of specification.

BACKGROUND OF THE INVENTION

1. Field of the Invention

The invention relates to an electronic device and, more particularly, to a foldable electronic device.

2. Description of the Related Art

In the information age, people become more dependent on electronic devices day by day. The electronic product is required to have high speed, high efficiency and be light, slim, short and small, and therefore, the foldable electronic device such as a notebook personal computer becomes essential in the life and work of modern people. Generally speaking, the foldable electronic device mostly includes two bodies, and two sides of the two bodies are connected with each other via a pivot element.

Generally, a user rotates the body having a display relative to the body having a keyboard to open the foldable electronic device when he or she uses the foldable electronic device. When the user plays a movie or music by an audio and video program, he or she may hear sound out from the loudspeaker disposed at the side of the keyboard or the display.

BRIEF SUMMARY OF THE INVENTION

The invention provides a foldable electronic device which is convenient to use.

The invention provides a foldable electronic device. It includes a first body, a second body, a pivot element and a loudspeaker. The pivot element is pivotally connected between the first body and the second body, and the loudspeaker is disposed in the pivot element and is capable of protruding out of a side of the pivot element.

In an embodiment of the foldable electronic device in the invention, the pivot element includes a pivot tube capable of containing the loudspeaker, and the pivot tube have a first opening and a second opening at two opposite sides, respectively. The loudspeaker includes a housing and a speaker. The housing is sleeved at the pivot tube and the speaker is disposed in the housing.

In an embodiment of the foldable electronic device in the invention, it further includes an elastic element. The elastic element is axially disposed between the loudspeaker and the pivot tube. The loudspeaker further includes a revolving element sleeved at an outside surface of the housing. The revolving element has a first positioning structure, and an inside surface of the pivot tube has a plurality of second positioning structures corresponding to the first positioning structure. Moreover, the first positioning structure is a flange, and the second positioning structures are recesses.

In an embodiment of the foldable electronic device in the invention, the housing includes a plurality of sound holes.

In an embodiment of the foldable electronic device in the invention, the elastic element is a spring.

In an embodiment of the foldable electronic device in the invention, the pivot tube has a guiding structure, and the first positioning structure of the revolving element is capable of moving along the guiding structure and driving the housing to move. The guiding structure is a slide rail.

As stated above, the foldable electronic device in the invention is more aesthetic by hiding the loudspeaker in the pivot element. Furthermore, compared with the conventional technology, space for disposing the loudspeaker in the first body or the second body can be saved, and then the saved space can be used to dispose other electronic components to increase functions of the foldable electronic device, or the size of the foldable electronic device may be decreased. Moreover, the user can move the loudspeaker out of the pivot element along the axial direction of the pivot element via a small force, which is convenient in use.

These and other features, aspects and advantages of the present invention will become better understood with regard to the following description, appended claims, and accompanying drawings.

DETAILED DESCRIPTION OF THE EMBODIMENTS

First Embodiment

Figure 1:
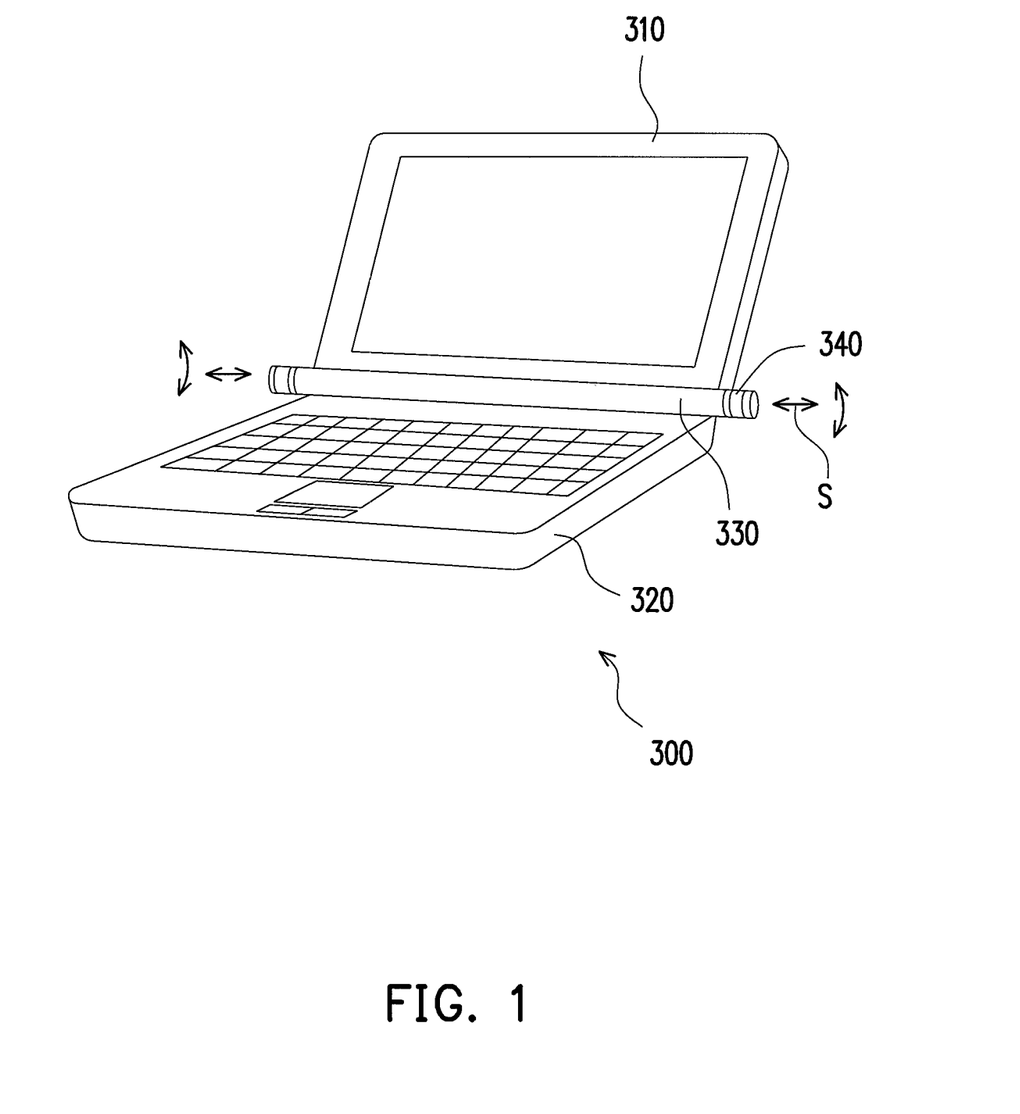
FIG. 1 is a schematic diagram showing the foldable electronic device according to a first embodiment of the invention.

FIG. 1 is a schematic diagram showing the foldable electronic device according to a first embodiment of the invention. As shown in FIG. 1, the foldable electronic device 300 includes a first body 310, a second body 320, a pivot element 330 and at least one loudspeaker 340. The pivot element 330 is pivotally connected between the first body 310 and the second body 320. The pivot element 330 has a pivot S, and the first body 310 rotates around the pivot S relative to the second body 320. The loudspeaker 340 is disposed in the pivot element 330 and can be protruded out of a side of the pivot element 330.

Figure 2A:
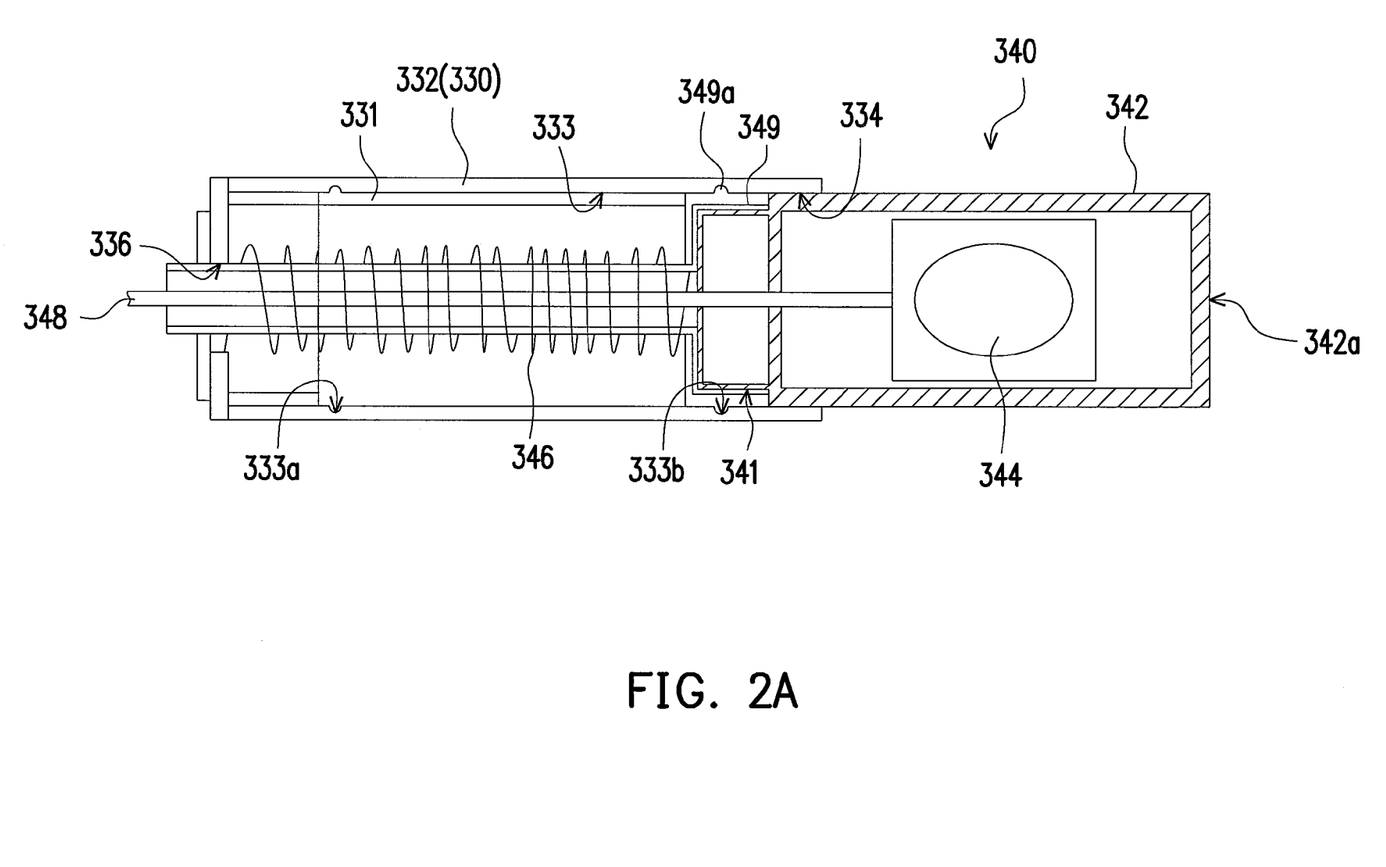
FIG. 2A is a sectional diagram showing the pivot element assembled with the loudspeaker.

FIG. 2A is a sectional diagram showing the pivot element assembled with the loudspeaker. As shown in FIG. 2A, the pivot element 330 includes a pivot tube 332, and the pivot tube 332 has a first opening 334 and a second opening 336 at the two sides, respectively. Furthermore the loudspeaker 340 includes a housing 342 and a speaker 344. The housing 342 is sleeved at the pivot tube 332, and the speaker 344 is disposed in the housing 342. The loudspeaker 340 further may include an audio cable 348 connected between the speaker 344 and an internal circuit (not shown) of the first body 310. The foldable electronic device 300 further includes an elastic element 346 axially disposed between the loudspeaker 340 and the pivot tube 332. The elastic element 346 of the embodiment may be a spring, and the audio cable 348 is connected with the speaker 344 through the second opening 336.

Figure 2B:
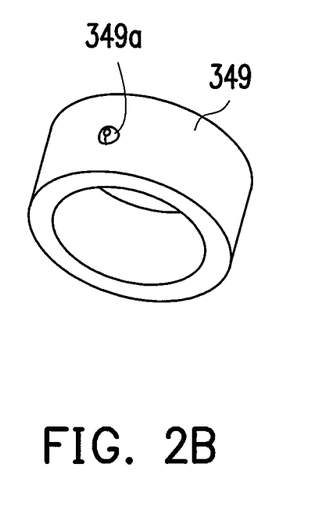
FIG. 2B is a schematic diagram showing the revolving element of the loudspeaker according to the first embodiment of the invention.

FIG. 2B is a schematic diagram showing the revolving element of the loudspeaker according to the first embodiment of the invention. As shown in FIGS. 2A and 2B, the loudspeaker 340 further includes a revolving element 349 sleeved at an outside surface 341 of the housing 342. The revolving element 349 includes a first positioning structure 349a, and an inside surface 333 of the pivot tube 332 includes a plurality of second positioning structures 333a and 333b corresponding to the first positioning structure 349a. The second positioning structures 333a and 333b are disposed near the second opening 336 and the first opening 334, respectively. The first positioning structure 349a may be fastened to the second positioning structure 333a to dispose the loudspeaker 340 in a first position (the loudspeaker 340 is contained in the pivot tube 332). The first positioning structure 349a also may be fastened to the second positioning structure 333b to dispose the loudspeaker 340 in a second position (the loudspeaker 340 is ejected out of the pivot tube 332).

In the embodiment, the first positioning structure 349a is a flange, and the second positioning structure 333a and 333b are recesses formed at the inside interface 333. Furthermore, the pivot tube 332 has a guiding structure 331, and the guiding structure 331 is a slide rail parallel to the pivot S.

Figure 3:
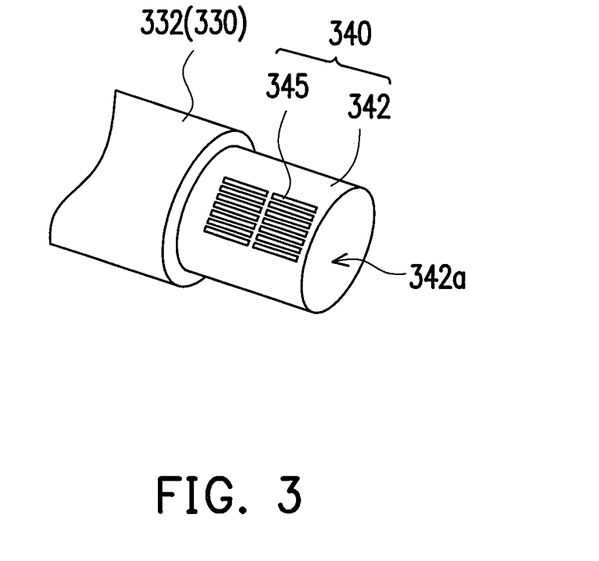
FIG. 3 is a three-dimensional schematic diagram showing the housing disposed in the pivot tube according to the first embodiment of the invention.

FIG. 3 is a three-dimensional schematic diagram showing the housing disposed in the pivot tube according to the first embodiment of the invention. As shown in FIG. 3, the loudspeaker 340 is protruded out of a side of the pivot element 330. The housing 342 further has a plurality of sound holes 345, and when the loudspeaker 340 is protruded out of the side of the pivot element 330, the sound holes 345 faces to the user at a preset angle.

Figure 4A:
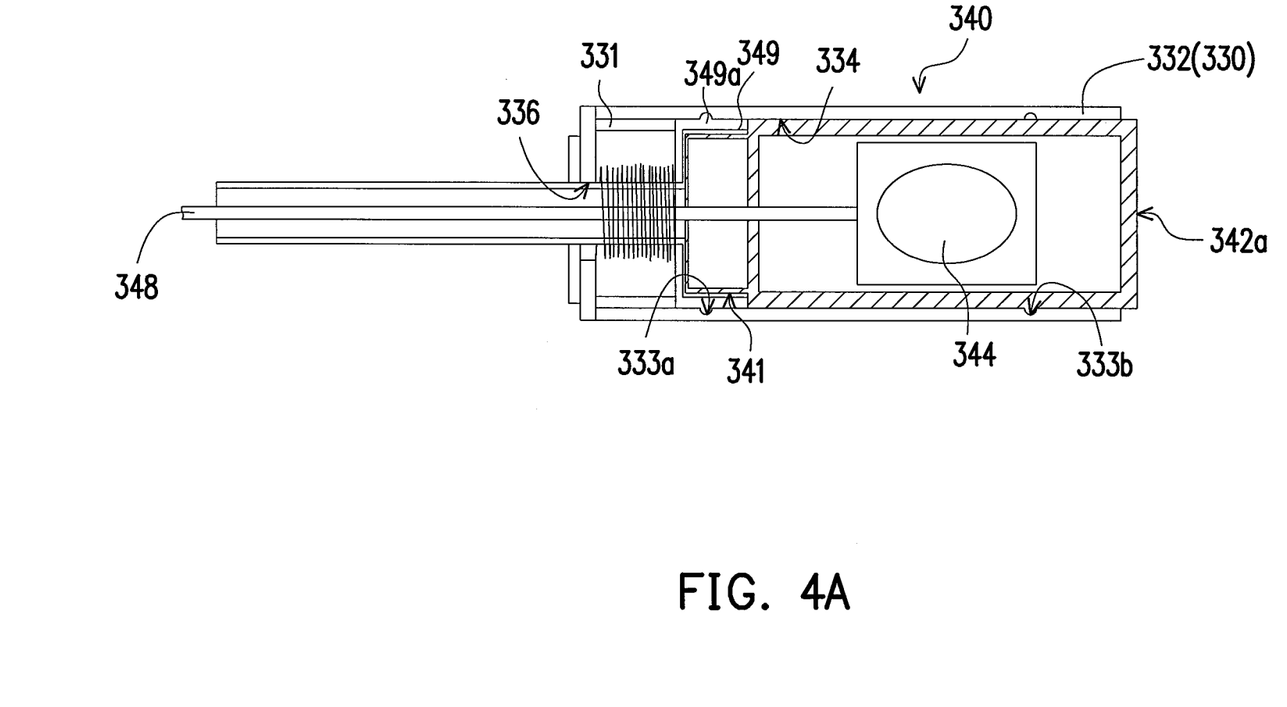
FIG. 4A is a schematic diagram showing the loudspeaker contained in the pivot element.

FIG. 4A is a schematic diagram showing the loudspeaker contained in the pivot element. As shown in FIG. 4A, when the loudspeaker 340 is contained in the pivot element 330, the housing 342 is disposed in the pivot tube 332. The first positioning structure 349a and the second positioning structure 333a interfere with each other to fasten the housing 342, and the elastic element 346 is compressed to store resilience.

Figure 4B:
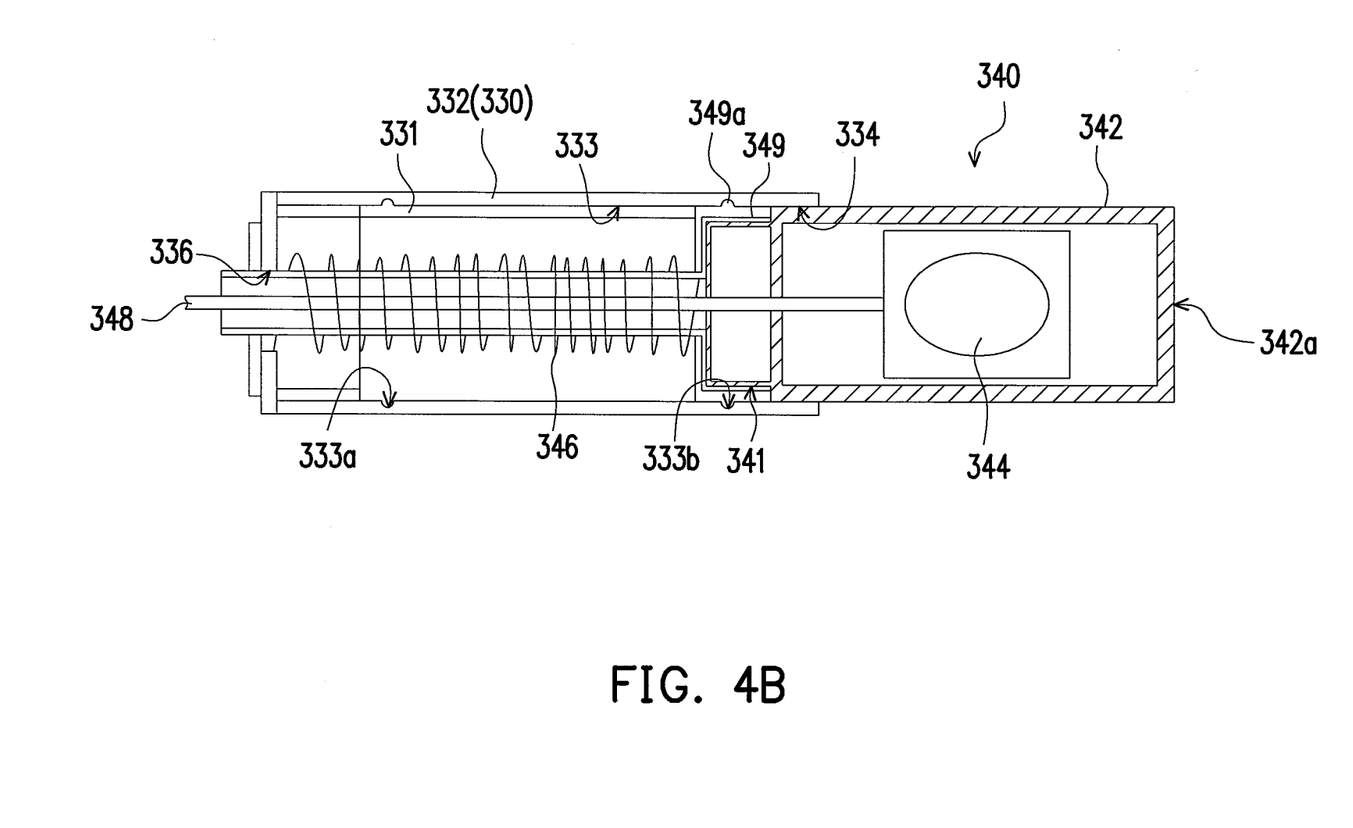
FIG. 4B is a schematic diagram showing the loudspeaker protruded out of the side of the pivot element.

FIG. 4B is a schematic diagram showing the loudspeaker protruded out of the side of the pivot element. As shown in FIGS. 4A and 4B, when the user wants to use the loudspeaker 340, he or she presses a press surface 342a of the loudspeaker 340 by a hand to release the first positioning structure 349a from the second positioning structure 333a. The resilience of the elastic element 346 pushes the housing 342 to move in the guiding structure 331 along the pivot S to make the housing 342 protrude out of the pivot element 330. When the housing 342 moves along the pivot S to be protruded out of the pivot element 330, the first positioning structure 349a can be fastened to the second positioning structure 333b near the first opening 334 in the pivot tube 332. Then, the loudspeaker 340 can be positioned in the second position, and it may be prevented from moving and being separated from the pivot tube 332.

When the housing 342 moves to be protruded out of the pivot element 330 along the pivot S, the sound hole 345 faces the user at a preset angle such as an angle of 45 degrees. Furthermore, the housing 342 and the revolving element 349 are sleeved together to allow the user to rotate the housing 342 relative to the revolving element 349 around the pivot S easily to adjust the angle at which the sound hole 345 faces the user.

Figure 5A:
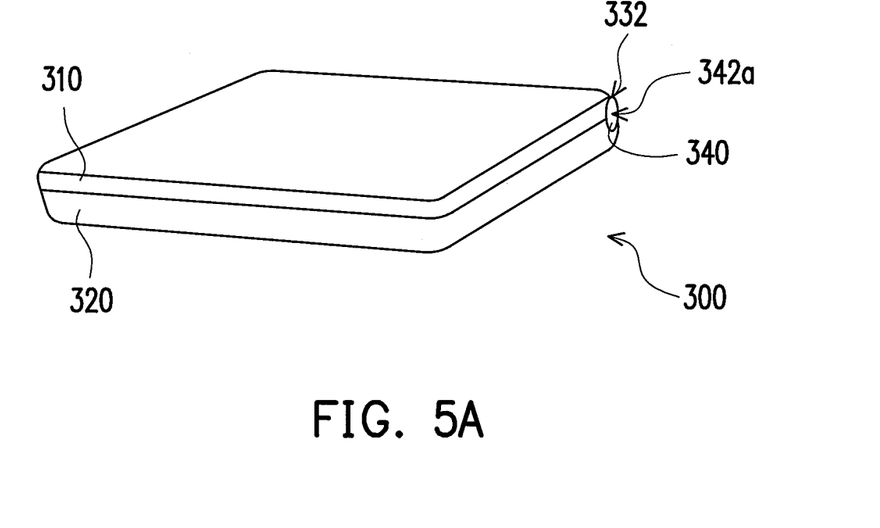
FIG. 5A and FIG. 5B are schematic diagrams showing the loudspeaker contained in the pivot tube and the loudspeaker protruded out of the pivot tube when the foldable electronic device is not opened, respectively.
Figure 5B:
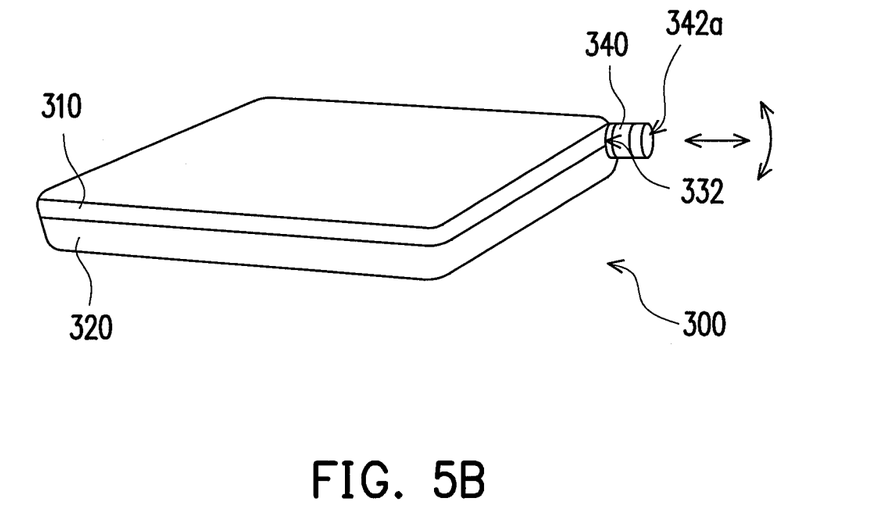

FIG. 5A and FIG. 5B are schematic diagrams showing the loudspeaker contained in the pivot tube and the loudspeaker protruded out of the pivot tube when the foldable electronic device is not opened, respectively. As shown in FIG. 3, FIG. 5A, and FIG. 5B, when the foldable electronic device 300 is closed, the user still can press the press surface 342a of the housing 342 of the loudspeaker 340 to make the loudspeaker 340 contained in the pivot tube 332 protrude out of the pivot tube 332. The user also can adjust the angle of the sound holes 345 of the loudspeaker 340. Compared with a common foldable electronic device whose loudspeaker cannot be exposed to play audio in a closed state, the foldable electronic device 300 of the embodiment is convenient in use and allows the user enjoy a nicer music atmosphere.

As stated above, in the foldable electronic device 300 of the embodiment, the loudspeaker 340 is hidden in the pivot element 330, and therefore, the appearance of the foldable electronic device 300 can be more integral and aesthetic due to the less holes in the foldable electronic device 300. Furthermore, compared with the conventional technology, space for disposing the loudspeaker 340 in the first body 310 or the second body 320 is saved, and then the saved space can be used to dispose other electronic components to increase functions of the foldable electronic device 300, or the size of the foldable electronic device 300 may be decreased effectively. Moreover, the user can move the loudspeaker 340 out of the pivot element 330 along the pivot S of the pivot element 330 by pressing the press surface 342a of the loudspeaker 340 slightly, which is convenient in use.

Second Embodiment

This embodiment is about the same with the first embodiment. Since the same element numbers denotes the same or similar component, they are not described for a concise purpose.

Figure 6:
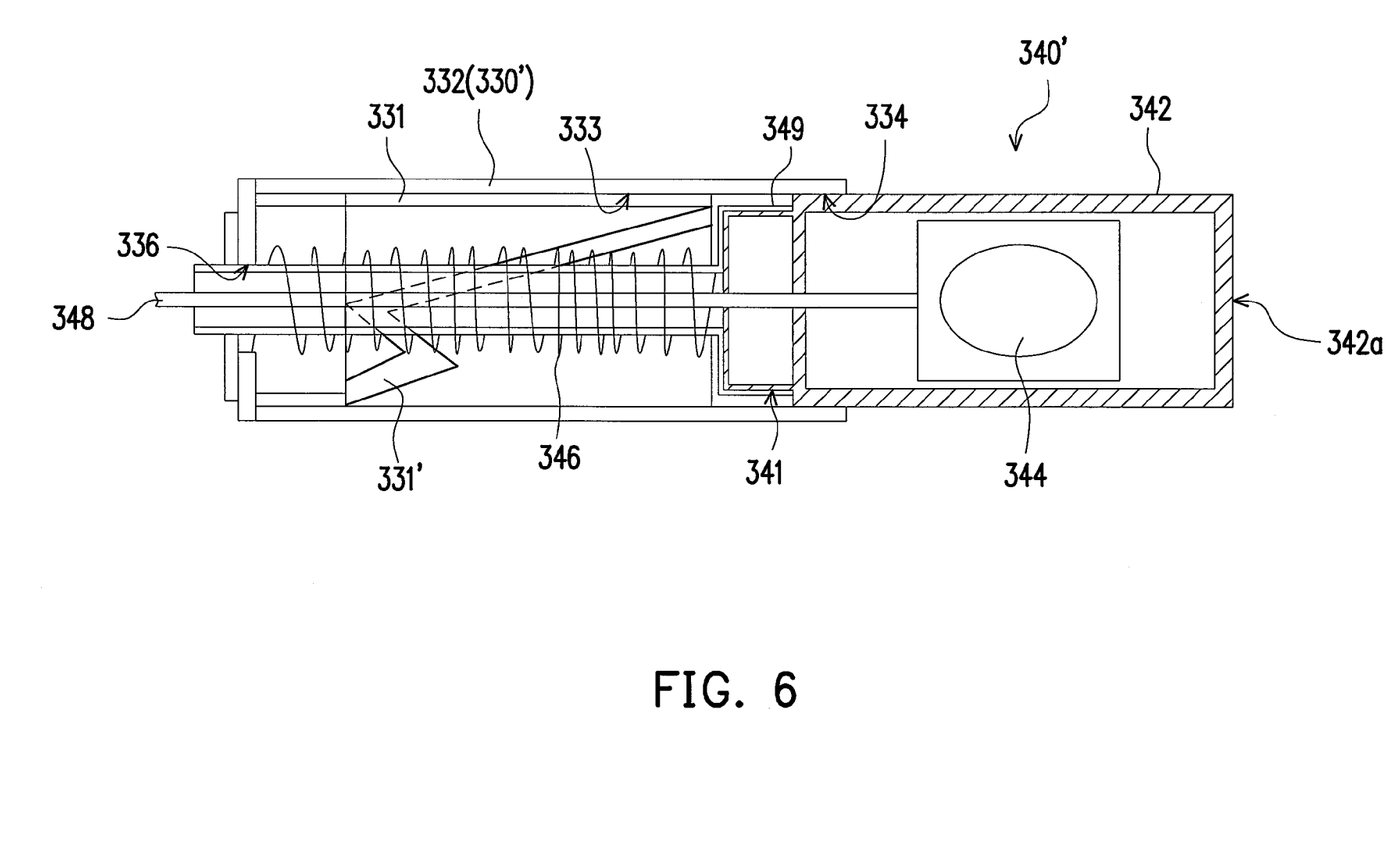
FIG. 6 is an assembly diagram showing the pivot element and the loudspeaker according to a second embodiment of the invention.

FIG. 6 is an assembly diagram showing the pivot element and the loudspeaker according to a second embodiment of the invention. As shown in FIG. 6, the guiding structure 331' is not a slide rail parallel to the pivot S, but a slide rail having a plurality of sections forming different angles with the pivot S.

FIG. 7A~7F are schematic diagrams showing different positions of the revolving element moving in the pivot tube. The right parts of FIG. 7A~7F are sectional diagram showing relative positions of the revolving element 349 and the pivot tube 332 when the first positioning structure 349a of the revolving element 349 moves in the guiding structure 331' of the pivot tube 332. The left parts of FIG. 7A~7F are schematic diagrams showing relative positions of the first positioning structure 349a in the guiding structure 331'. By the way, readers should know that when the revolving element 349 rotates relative to the pivot tube 332, the pivot tube 332 is fixed and the revolving element is rotational. In the FIG. 7A~7F, the position of the corresponding revolving element 349 in the pivot tube 332 is shown according to the position of the first positioning structure 349a in the guiding structure 331'.

Figure 7A:
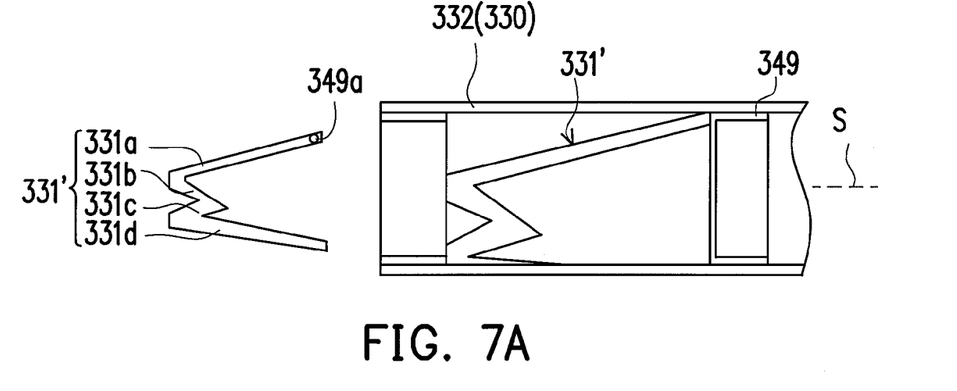
FIG. 7A~7F are schematic diagrams showing different positions of the revolving element moving in the pivot tube.

As shown in FIG. 7A, for example, the guiding structure 331' can be divided into a first portion 331a, a second portion 331b, a third portion 331c and a fourth portion 331d connected with each other. The first positioning structure 349a moves from the right end of first portion 331a of the guiding structure 331', passes through the second portion 331b and the third portion 331c, and reaches the right end of the fourth portion 331d.

Furthermore, the revolving element 349 is sleeved at the housing 342 (shown in FIG. 6). Therefore, the revolving element 349 drives the housing 342 to rotate around the pivot S along the guiding structure 331' when the first positioning structure 349a moves along the track of the guiding structure 331'.

Figure 7B:
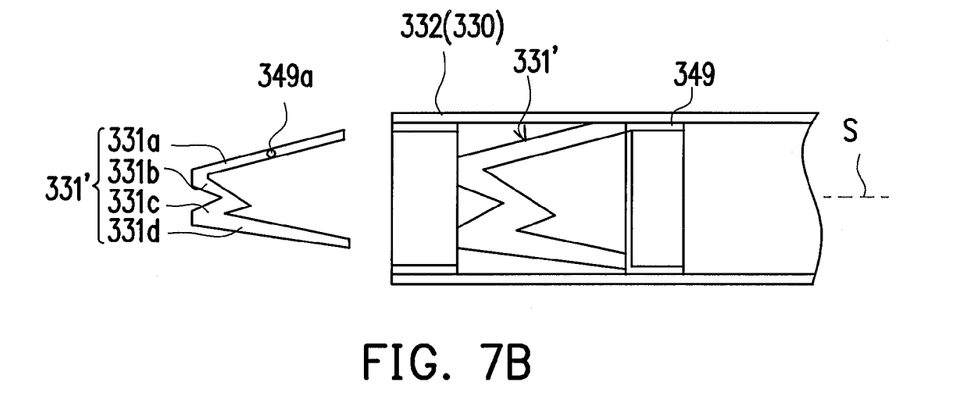
Figure 7C:
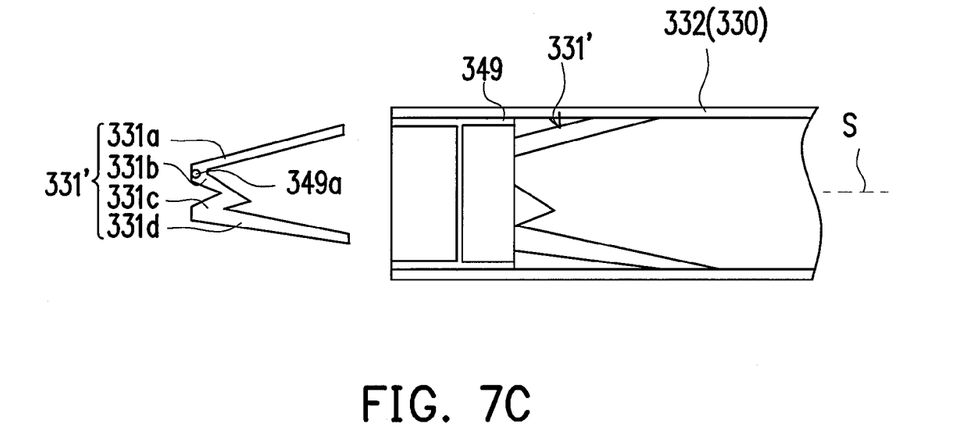
Figure 7D:
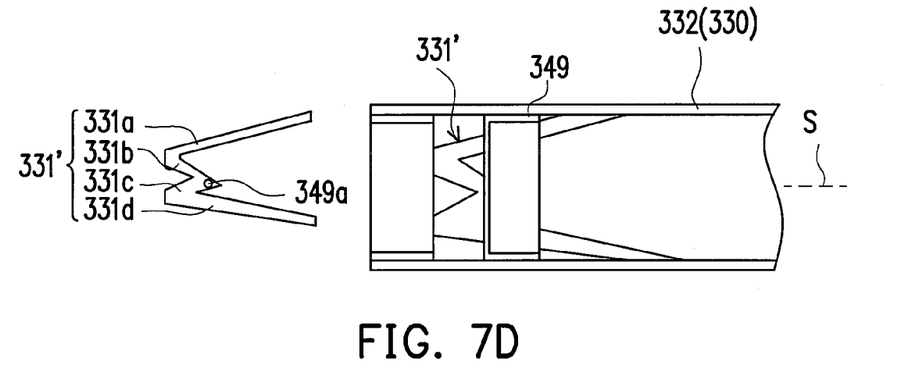

As shown in FIG. 7A, when the loudspeaker 340' is protruded out of the pivot element 330, the user may press the press surface 342a to move the housing 342 and press the elastic element 346 by a hand. As shown in FIG. 7B, the first positioning structure 349a moves to the inner side of the second opening 336 of the pivot tube 332 along the track of guiding structure 331' until it reaches the end of the first portion 331a. The revolving element 349 moves to the second opening 336 around the pivot S and rotates relative to the pivot tube 332. As shown in FIGS. 7C and 7D, when the user presses the housing 342, makes the first positioning structure 349a move to the connection portion of the first portion 331a and the second portion 331b, and then releases his or her hand, the resilience of the elastic element 346 drives the first positioning structure 349a to move to the connection portion of the second portion 331b and the third portion 331c along the second portion 331b.

The structure of the second portion 331b and the third portion 331c connected with each other is designed to restrict the first guiding structure 349a, and then the loudspeaker 340' can be contained in the pivot tube 332.

Figure 7E:
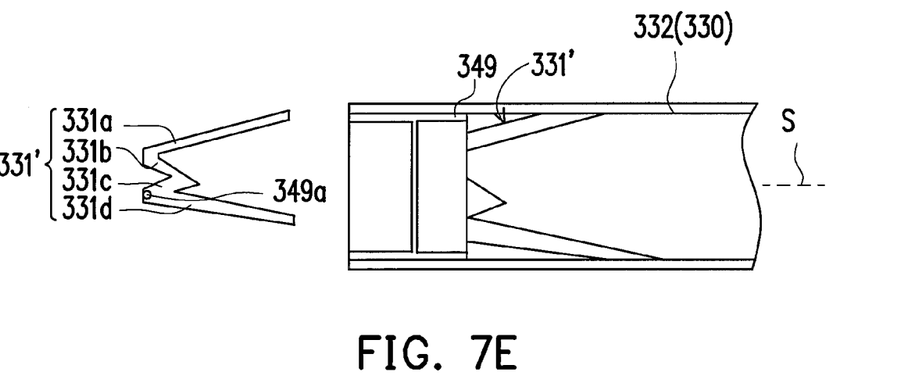
Figure 7F:
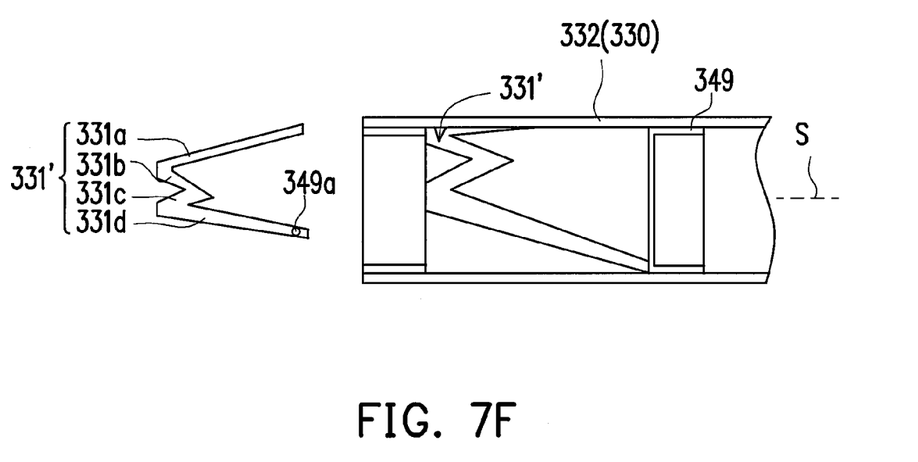

As shown in FIG. 7D, when the user wants to use the loudspeaker 340' (shown in FIG. 6), he or she presses the press surface 342a again to make the housing 342 press the elastic element 346 (shown in FIG. 6). As shown in FIG. 7E, the first positioning structure 349a moves to the connection portion of the third portion 331c and the fourth portion 331d. Then as shown in FIG. 7F, the resilience of the elastic element 346 drives the first positioning structure 349a to move to the end of the fourth portion 331d along the fourth portion 331d.

In the embodiment, when the loudspeaker 340' reciprocates between the position where the loudspeaker 340' is contained in the pivot tube 332 and the position where the 340' protrudes out of the pivot tube 332, the revolving element 349 rotates relative to the pivot tube 332, and the first positioning structure 349a of the revolving element 349 moves along the guiding structure 331'. Therefore, when the loudspeaker 340' is protruded out of the side of the pivot tube 332, the sound hole 345 is designed to face the user.

Furthermore, when the user presses the press surface 342a to make the loudspeaker 340' move relative to the pivot element 330, he or she may feel the motion of the first positioning structure 349a at the turning point of the first portion 331a and the second portion 331b, and the turning point of the third portion 331c and the fourth portion 331d and enjoy a preferred operational hand feeling.

To sum up, the foldable electronic device of the invention has at least the following advantages.

First, the loudspeaker is hidden in the pivot element to reduce holes at the appearance of the foldable electronic device, and thus the foldable electronic device is more aesthetic. Furthermore, compared with a common foldable electronic device, space for disposing the loudspeaker in the first body or the second body is saved, and the saved space can be used to dispose other electronic components to increase functions of the foldable electronic device, or the size of the foldable electronic device may be decreased effectively.

Second, the user may move the loudspeaker out of the pivot element along the axial direction of the pivot element by pressing the pivot element slightly, and therefore the foldable electronic device is convenient in use.

Third, the loudspeaker can be protruded out of the pivot element, and the sound direction of the loudspeaker may be adjusted even though the foldable electronic device of the invention is closed.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A foldable electronic device comprising:
a first body;
a second body;
a pivot element, having a pivot tube and the pivot element pivotally connected between the first body and the second body; and
a loudspeaker, disposed in the pivot tube and capable of protruding out of a side of the pivot element, the loudspeaker comprises:
a housing, sleeved at the pivot tube;
a speaker, disposed in the housing; and
a revolving element, disposed within the pivot tube and sleeved at an outside surface of the housing, the revolving element having a first positioning structure, and an inside surface of the pivot tube having a plurality of second positioning structures corresponding to the first positioning structure, the first positioning structure is capable of driving the housing to move.

2. The foldable electronic device according to claim 1, wherein the pivot tube is capable of containing the loudspeaker, and two opposite sides of the pivot tube have a first opening and a second opening, respectively.

3. The foldable electronic device according to claim 2, further comprising:
an elastic element axially disposed between the loudspeaker and the pivot tube.

4. The foldable electronic device according to claim 1, wherein the first positioning structure is a flange, and the second positioning structures are recesses.

5. The foldable electronic device according to claim 1, wherein the housing further comprises a plurality of sound holes.

6. The foldable electronic device according to claim 3, wherein the elastic element is a spring.

7. The foldable electronic device according to claim 1, wherein the pivot tube has a guiding structure, and the first positioning structure of the revolving element is capable of moving along the guiding structure and driving the housing to move.

8. The foldable electronic device according to claim 7, the guiding structure is a slide rail.

* * * * *